(12) United States Patent
Ceugniet et al.

(10) Patent No.: US 10,521,721 B2
(45) Date of Patent: Dec. 31, 2019

(54) GENERATING A SOLUTION FOR AN OPTIMIZATION PROBLEM

(71) Applicant: International Business Machines Corporation, Armonk, NY (US)

(72) Inventors: Xavier Ceugniet, Le Rouret (FR); Alain Chabrier, Madrid (ES); Stephane Michel, Roquefort les Pins (FR); Susara A. Van den Heever, Chateauneuf de Grasse (FR)

(73) Assignee: International Business Machines Corporation, Armonk, NY (US)

( * ) Notice: Subject to any disclaimer, the term of this patent is extended or adjusted under 35 U.S.C. 154(b) by 676 days.

(21) Appl. No.: 15/223,120

(22) Filed: Jul. 29, 2016

(65) Prior Publication Data

US 2017/0293840 A1    Oct. 12, 2017

(30) Foreign Application Priority Data

Apr. 8, 2016   (EP) .................................... 16382160

(51) Int. Cl.
 *G06N 5/00*   (2006.01)
 *G06Q 30/02*  (2012.01)
(52) U.S. Cl.
 CPC ......... *G06N 5/003* (2013.01); *G06Q 30/0201* (2013.01)
(58) Field of Classification Search
 CPC ........................... G06N 5/003; G06Q 30/0201
 See application file for complete search history.

(56) References Cited

U.S. PATENT DOCUMENTS

| 8,949,773 B2 * | 2/2015 | Paradkar ................... G06F 8/34 |
| | | 705/7.13 |
| 2004/0153376 A1 * | 8/2004 | Ganesan ................ G06Q 10/06 |
| | | 705/7.36 |

(Continued)

OTHER PUBLICATIONS

Johannes Kunze von Bischhoffshausen, An Information System for Sales Team Assignments Utilizing Predictive and Prescriptive Analytics Jul. 2015, IEEE, 2015 IEEE 17th Conference on Business Informatics.*

(Continued)

*Primary Examiner* — Li B. Zhen
*Assistant Examiner* — Tewodros E Mengistu
(74) *Attorney, Agent, or Firm* — Winstead, P.C.

(57) ABSTRACT

A method, system and computer program product for generating a solution to an optimization problem. A received structured set of data is analyzed with the prescriptive domains to identify one or more prescriptive domains that match the received structure set of data in data structure and/or semantic terms. A user selection of one of the presented possible prescriptive intentions from the intention templates in the identified one or more prescriptive domains that match the received structure set of data in data structure and/or semantic terms is received. A prescriptive model is then generated from the prescriptive domain containing the selected prescriptive intention. The prescriptive model is translated into a technical prescriptive model using a set of mapping rules. Furthermore, the technical prescriptive model is translated into an optimization model. The optimization model is solved and an output defining a solution from the solved optimization model is presented.

12 Claims, 12 Drawing Sheets

(56) References Cited

U.S. PATENT DOCUMENTS

2006/0004845 A1* 1/2006 Kristiansen ............... G06F 8/38
2013/0290072 A1 10/2013 Ren
2014/0278815 A1 9/2014 Grant et al.
2015/0206075 A1 7/2015 Feillet et al.

OTHER PUBLICATIONS

IBM, "IBM Decision Optimization Center," http://www-03.ibm.com/software/products/en/decision-optimization-center, 2015, pp. 1-3.
"ILOG JConfigurator," http://www.kstec.co.kr/products/jconfigurator/default.htm, 2015, one page.
IBM, "Analytics Made Easy," http://www.ibm.com/analytics/watson-analytics, 2015, pp. 1-3.
IBM, "Fix Pack 1 for IBM Decision Optimization Center Solutions Accelerator v3.8 Available on Fix Central," http://www-01.ibm.com/support/docview.wss?uid=swg24038173, 2015, pp. 1-3.

* cited by examiner

GENERATING A SOLUTION FOR AN OPTIMIZATION PROBLEM

BACKGROUND

The present invention relates to computer implemented method, a computer system and a computer program product for generating a solution to an optimization problem.

SUMMARY

In one embodiment of the present invention, a computer implemented method for generating a solution to an optimization problem comprises receiving a structured set of data. The method further comprises accessing, by a processor, a plurality of prescriptive domains containing one or more templates, each template defining an intention, goal or constraint. The method additionally comprises analyzing, by the processor, the received structured set of data with the prescriptive domains to identify one or more prescriptive domains that match the received structure set of data in data structure and/or semantic terms. Furthermore, the method comprises presenting a plurality of possible prescriptive intentions from the intention templates in the identified one or more prescriptive domains that match the received structure set of data in data structure and/or semantic terms. Additionally, the method comprises receiving a user input selecting one of the presented plurality of possible prescriptive intentions. In addition, the method comprises generating, by the processor, a prescriptive model from the prescriptive domain containing the selected prescriptive intention, the prescriptive model comprising the structured set of data and one or more instances of templates defining goals and/or constraints from the prescriptive domain containing the selected prescriptive intention. The method further comprises translating, by the processor, the prescriptive model into a technical prescriptive model using a set of mapping rules to translate instances of the templates of the prescriptive domain into instances of templates of a technical prescriptive domain. The method additionally comprises translating, by the processor, the technical prescriptive model into an optimization model. Furthermore, the method comprises solving, by the processor, the optimization model. Additionally, the method comprises presenting an output defining a solution from the solved optimization model.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
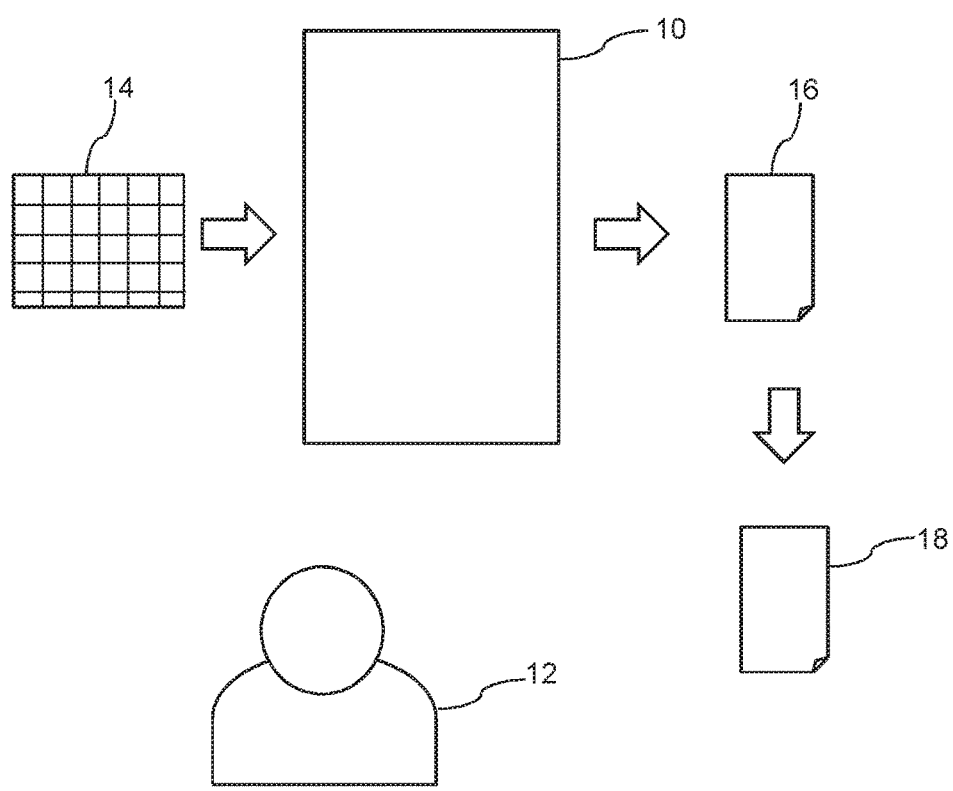
FIG. 1 is a schematic diagram of an expert system in accordance with an embodiment of the present invention.

FIG. 1 shows an expert system 10 that is accessed by a user 12. The user 12 has a structured set of data 14 that is supplied to the expert system 10, and the expert system 10 generates a prescriptive model 16 from the structured set of data 14. The expert system 10, in turn, then generates an optimization model 18 from the prescriptive model 16. The user 12 is a business user such as a sales manager who has a problem to solve, such as how to assign their sales force to different territories. The set of data 14 is a spreadsheet that defines the individuals who are sales reps in terms of their starting location, target revenue and so on. The spreadsheet contains multiple pages, with other pages including information about customers and other relevant material.

This is an example of a territory assignment problem. In this problem, the sales manager 12 needs to assign the sales representatives from a team to territories, and taking into account some constraints and goals. The data 14 includes a set of sales representatives with their geographic home location, target quota, maximum number of customers they can manage, and any other possible property which can be needed to formulate a goal or constraint and a set of territories, with their geographic location, number of customers, expected total revenue, and so on.

The business user 12 would have in mind one or more quantities to try to optimize (i.e., goals) such as the user 12 wants as many territories (all if possible) to be assigned, or the user 12 wants the total distance covered by a sales rep to reach the territories they are assigned to be as low as possible, or the user 12 wants to balance this total distance overall sales representatives, or the user wants to have sales representatives to be assigned territories in order to correspond to their quota, and so on. The business user 12 has an expertise in their business domain and is also aware of a set of constraints which have to be fulfilled when assigning sales representative to territories such as there can be only one sales representatives assigned to each territory, and/or there is some limit on the number of territories one sales representatives can be assigned to, and this limit may depend on the sales representative considered, and/or the total distance traveled by a sales representative has to be limited, and so on. The decisions in these cases are possible assignments of sales representatives to territories. A feasible solution is a set of decisions which fulfils all the constraints, and an optimal solution is one (there can be several alternative optimal solutions) which is feasible but also has the best value for goals among all possible feasible solutions.

The expert system 10 is able to generate the prescriptive model 16 in conjunction with input from the user 12 and also based upon stored technical prescriptive domains and business prescriptive domains. Each technical prescriptive domain defines a generic optimization problem and each business prescriptive domain extends a technical prescriptive domain and defines a more specific business problem which is an implementation of the generic optimization problem defined in the technical prescriptive domain from which the business prescriptive domain extends. Most business problems are actually extensions of a small number of known technical problems, which can be defined by the author of the expert system 10, and of which the business user 12 does not need to be aware.

Examples of known technical problems are scheduling problems, routing problems and resource assignment problems. A technical prescriptive domain may define and describe a resource assignment problem and a business prescriptive domain may define and describe a territory assignment problem as an extension of the technical prescriptive domain defining and describing the resource assignment problem. The domains can be expressed as XML documents that are templates expressing property definitions, hierarchies and relationships between properties expressed in definitions. Each technical prescriptive domain defines a category of optimization problems and each business prescriptive domain defines, for a given category, a description of a correspondence between the business problem and the underlying technical prescriptive domain. Each business prescriptive domain always relies on one existing technical prescriptive domain.

Figure 2:
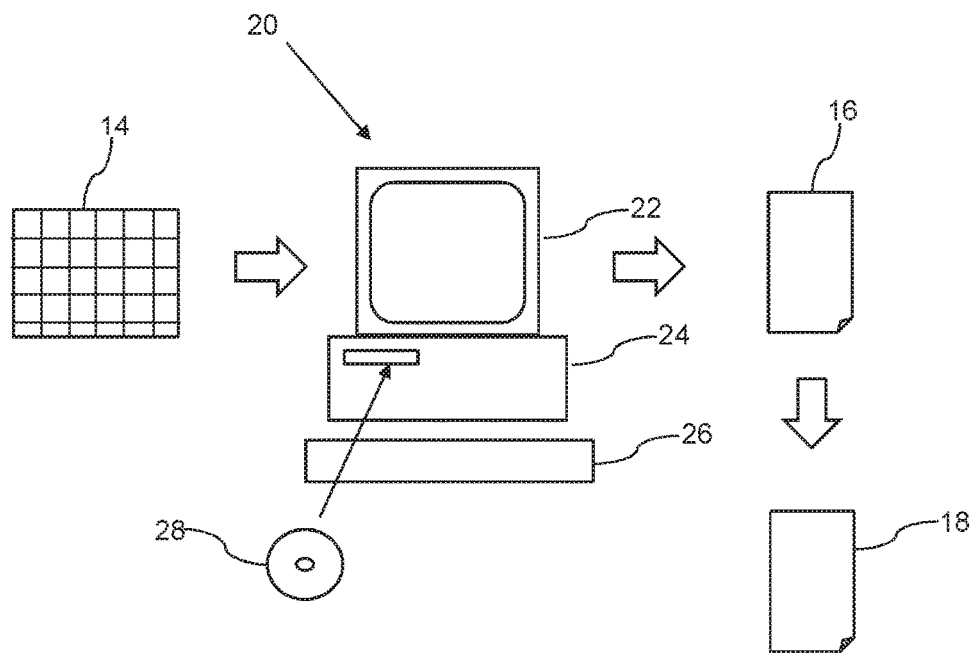
FIG. 2 is a schematic diagram of a computer system for running the expert system in accordance with an embodiment of the present invention.

FIG. 2 shows a computer system 20 that is used to operate the expert system 10. The computer system 20 comprises a display device 22, a processor 24 and a user input device 26. A computer program product is provided that is stored on a computer readable medium 28, here a CD-ROM 28. The computer program product comprises a set of instructions that are used to control the processor 24. The processor 24 executes the instructions from the computer program product in order to operate the expert system 10. The computer system 20 shown here is a desktop computer; however the functionality provided by the computer system 20 can also be delivered by a remote server that comprises a set of distributed components.

The user 12 interacts with the expert system 10 via the computer system 20. The business user 12, who is not an expert in either software programming or business optimization, can bring their problem to the expert system 10, using their dataset 14, which defines the data to which their problem relates. The expert system 10, through the provision of the technical prescriptive domains and the business prescriptive domains is able to recognize the likely nature of the user's problem and offer the user 12 a set of possible prescriptive intentions that are presented to the user 12 in order for the user 12 to select one of the presented intentions to begin the process of creating a prescriptive model 16 for the problem that the user 12 wishes to solve. The intentions are presented to the user as instances of templates maintained within one or more prescriptive domains.

For example, the user's dataset 14 (a spreadsheet) may have a first page with columns titled: salesrep, capacity, home state and so on and a second page with columns titled: state, expected revenue, customers, current salesrep. Possible intentions from such a dataset 14 might be "how best to assign salesrep to state?", "how to fairly define a salesrep quota?". These options, and many others, can be put to the user 12 after an initial pass of their dataset 14, in order to present the user 12 with options that reflect the problem that they wish to solve. The purpose of the presented prescriptive intentions is to move towards a prescriptive model 16 that can be used to solve the user's problem.

The user can provide a natural language input in relation to the selection of an intention for their problem. For example, the instances of intention templates that are presented to the user, after the system has processed the user's dataset 14, may not be close enough to the problem that the user is trying to solve or may not be worded precisely enough for the user. The user can make a natural language input at this point, and this can be used to either provide one or more additional intentions to the user or to adapt those currently presented, in order to generate an instance of the an intention template that correctly defines the problem that the user is trying to solve.

Figure 3:
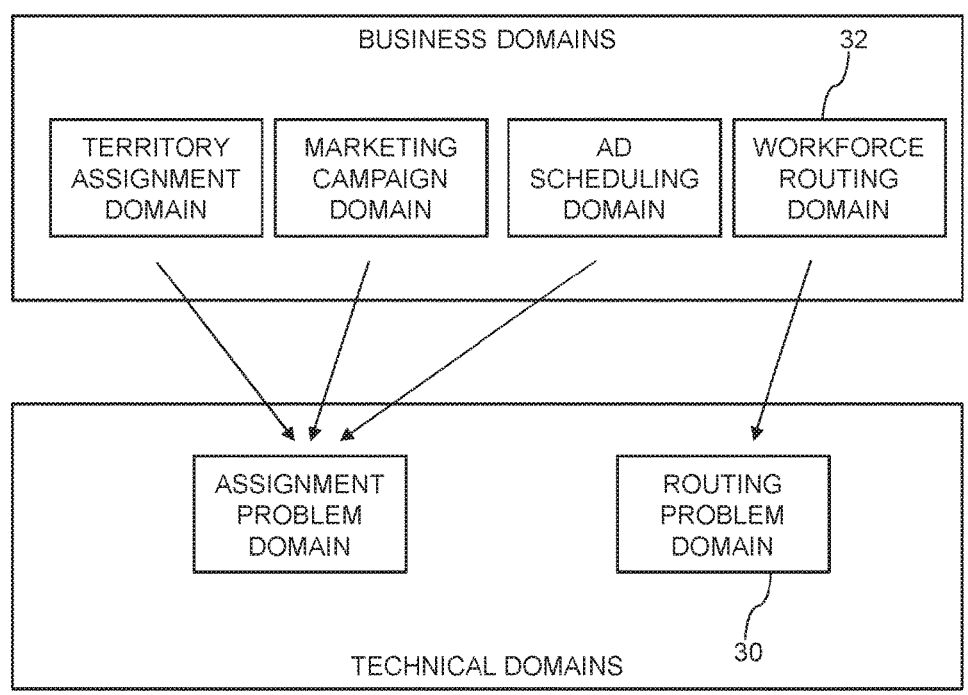
FIG. 3 is a schematic diagram of technical prescriptive domains and business prescriptive domains in accordance with an embodiment of the present invention.

FIG. 3 illustrates the relationship between technical prescriptive domains 30 and business prescriptive domains 32. A technical domain 30 such as a routing problem domain can be extended by a business domain 32 such as a field workforce routing problem. A technical domain 30 such as an assignment problem domain is here shown extended by three separate business domains 32: a territory assignment domain, a marketing campaign optimization domain and an ad scheduling domain. These domains 30 and 32 are authored by experts in optimization and business analysts, in order to simplify the load on the end user 12. These domains 30 and 32 are transparent to the user 12 who is not aware of their existence or contents.

A technical domain 30 relating to the assignment problem domain can include XML as follows:

```
<domain name="ResourceAssignment" extends="Prescriptive">
    <concepts>
        <!-- Domain technical concepts -->
        <category name="cAssignable" desc="Assignment
        of resources to activities">
            <extends>cStructure</extends>
            <has label="capacity" card="1:1">cCapacity</has>
        </category>
        <category name="cResource" desc="Resource">
            <extends>cAssignable</extends>
        </category>
        <category name="cActivity" desc="Activity">
            <extends>cAssignable</extends>
        </category>
        <category name="cAssignment" desc="Assignment of
        resources to activities">
            <extends>cStructure</extends>
            <has label="resource" card="1:1">cResource</has>
            <has label="activity" card="1:1">cActivity</has>
        </category>
. . .
```

A business domain 32 for the example of territory assignment can include XML as follows:

```
<domain name="TerritoryAssignment" extends="ResourceAssignment">
    <concepts>
        <!-- Domain business concepts -->
        <category name="cSalesRep" desc="Sales representative
        structure">
            <extends>cResource</extends>
            <has label="id" card="1:1">cidSalesRep</has>
            <has label="quota" card="1:1">cQuota</has>
            <has label="home" card="1:1">cGeography</has>
        </category>
        <category name="cidSalesRep" desc="Id of sales
        representative">
            <extends>cCategory</extends>
        </category>
        <category name="cTerritory" desc="Sales territory
        structure">
            <extends>cActivity</extends>
            <has label="id" card="1:n">cidTerritory</has>
            <has label="geography"
            card="1:n">cGeography</has>
            <has label="expectedRevenue"
            card="1:1">cRevenue</has>
            <has label="initialAssignment"
            card="1:1">cSalesRep</has>
            <has label="customersCount"
            card="1:1">cCustomer
            Count</has>
        </category>
...
```

The parts of the domains 30 and 32 illustrated above relate only to the parts of the domains 30 and 32 that cover data modelled in the respective domains 30 and 32. Each domain 30 and 32 also includes templates defining intentions, goals and constraints.

Once the user 12 has chosen an intention from those offered to them, then their dataset 14 is configured using a base structure defined in the prescriptive domain containing the intention selected by the user 12. The spreadsheet 14 of the user 12 is structured as follows:
semantic.model.impl.BusinessConceptI cTerritoryAssignment(label:cTerritoryAssignment) is a category and a cAssignment with properties:
    0:1 cTerritoryAssignment.salesRep as cSalesRep
    0:1 cTerritoryAssignment.territory as cTerritory
semantic.model.impl.BusinessConceptI cidSalesRep(label: cidSalesRep) is a category and a cCategory with no property
semantic.model.impl.BusinessConceptI cidTerritory(label: cidTerritory) is a category and a cCategory with no property
semantic.model.impl.BusinessConceptI salesrep(label: salesrep) with properties:
  (primary key)0:1 salesrep.salesrep as category(internal type: STRING)
  0:1 salesrep.index as numericKey(internal type: INTEGER)
  0:1 salesrep.capacity as volume(internal type: INTEGER)
  0:1 salesrep.quota as monetary(internal type: INTEGER)
  0:1 salesrep.home as state
semantic.model.impl.BusinessConceptI state(label:state) with properties:
  (primary key)0:1 state.state as geographic(internal type: STRING)
  0:1 state.expected revenue as monetary(internal type: INTEGER)
  0:1 state.customers as count(internal type: INTEGER)
  0:1 state.initial salesrep as salesrep The various column headings with the spreadsheet are labelled according to the matching concepts within the relevant prescriptive domain and they are labelled as properties with certain types of features. The "expected revenue" column for example is identified as a monetary component that is an integer, the "state" column is identified as a geographic component that is a string, and so on. This analysis leads to the consideration of goals and constraints within the prescriptive domain. An example of a constraint template is:

```
<category name=
"cFixedLimitNumberOfActivitiesAssignedToEachResource">
    <extends>cIterativeRelationalConstraint</extends>
    <score value="2" />
    <bind property="iterativeConcept">cResource</bind>
    <bind
property="firstNumeric">count(cResource/inverse(cAssignment/
resource)):context=cResource</bind>
    <bind property="relationalOperator">lessThanOrEqualsTo</bind>
    <bind
property="secondNumeric">plus(1,div(count(cActivity),
count(cResource)))</bind>
    <bind property="iterativeFilter"></bind>
</category>
```

This constraint template can be expressed to the user 12 as "number of states assigned to each salesrep is less than or equal to x", where x can be left for the user 12 to choose or can be presented as an initial number from the number of states divided by the number of salesreps. The user 12 can change value of x and can also change the operator from "less than or equal to" to any other standard operator ("greater than" and as on). The constraint could also be expressed to the user as the reverse expression "number of salesreps assigned to each state is . . . ". An example of goal template is:

```
<category name="cMinimizeHomeStateDistance">
    <extends>cMinimizeGoal</extends>
    <score value="4"/>
    <bind      property="numericExpr">sum
(cTerritoryAssignment,distance(cTerritoryAssignment/territory/geography,
            cTerritoryAssignment/salesRep/home))</bind>
    <bind
property="scaleFactorExpr">sum(cTerritory,min(cSalesRep,
distance(cTerritory/geography,cSalesRep/home)))</bind>
</category>
```

This goal template defines a goal to "minimize overall distance covered by salesrep (based on salesrep home". These templates are examples of the templates that will be present within a prescriptive domain that are used to create specific instances of the templates that are added to the prescriptive model 16. A single unique template can have multiple instances within the model 16.

A prescriptive domain 30 and 32 (either technical or business) formalizes the knowledge to conduct a prescriptive analysis in a business domain (such as SalesTerritoryAssignment) or in a technical domain (such as AssignmentProblem). A prescriptive domain can be declared as a specialization of another prescriptive domain, making all entities of the second domain visible in the first domain. For instance the business domain SalesTerritoryAssignment extends the technical domain AssignmentProblem, which itself extends technical domain PrescriptiveProblem.

Figure 4:
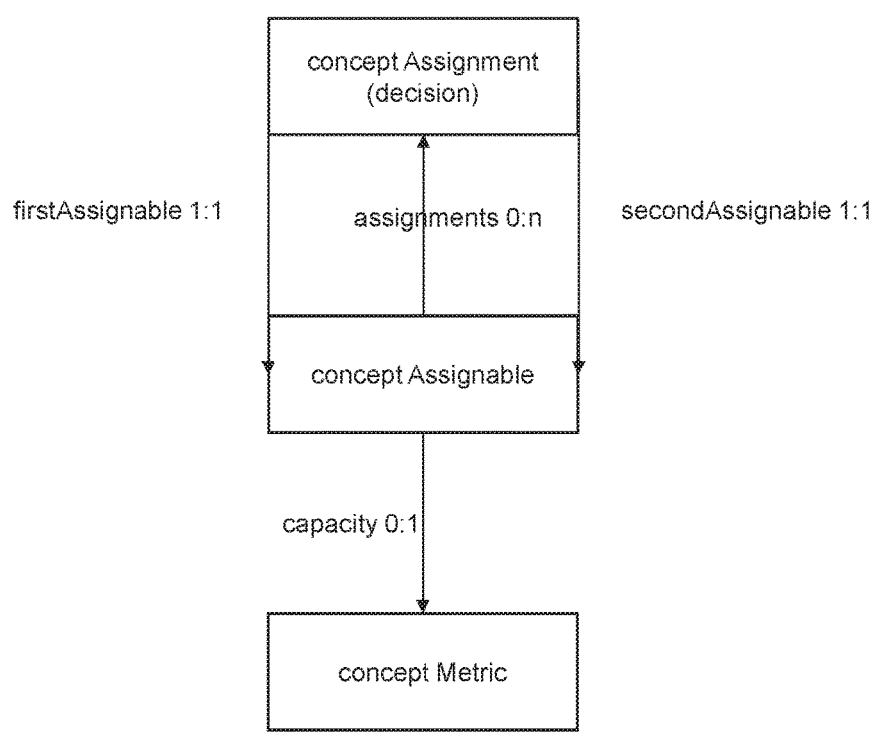
FIGS. 4 and 5 show diagrams of the interrelationships between concepts in a prescriptive domain in accordance with an embodiment of the present invention.

A prescriptive domain 30 and 32 contains templates that define various entities, such as intentions, concepts, goals, constraints and business goals and constraints mapping rules. Concepts are used to represent concrete entities of a business domain 32 such as Territory, SalesRep, TerritoryAssignment in a domain SalesTerritoryAssignment or more abstract entities of a technical domain 30 such as Assignment and Assignable in a domain AssignmentProblem. Each concept exposes a set of selectable properties, for example an Assignment concept has two properties: firstAssignable and secondAssignable and an Assignable concept has two properties: assignments and capacity. This is shown in FIG. 4. Each property has a semantic type which is a built-in concept (for example a property capacity has a semantic type Metric) or a domain concept (for example both firstAssignable and secondAssignable have a semantic type Assignable). A property has an arity, for example the arity of capacity is 0:1, which means that Assignable has either no capacity value or a unique value. An arity of 1:1 means that a property is always present uniquely so. An arity of 0:n means that a property is not necessarily present or has n versions.

Figure 5:
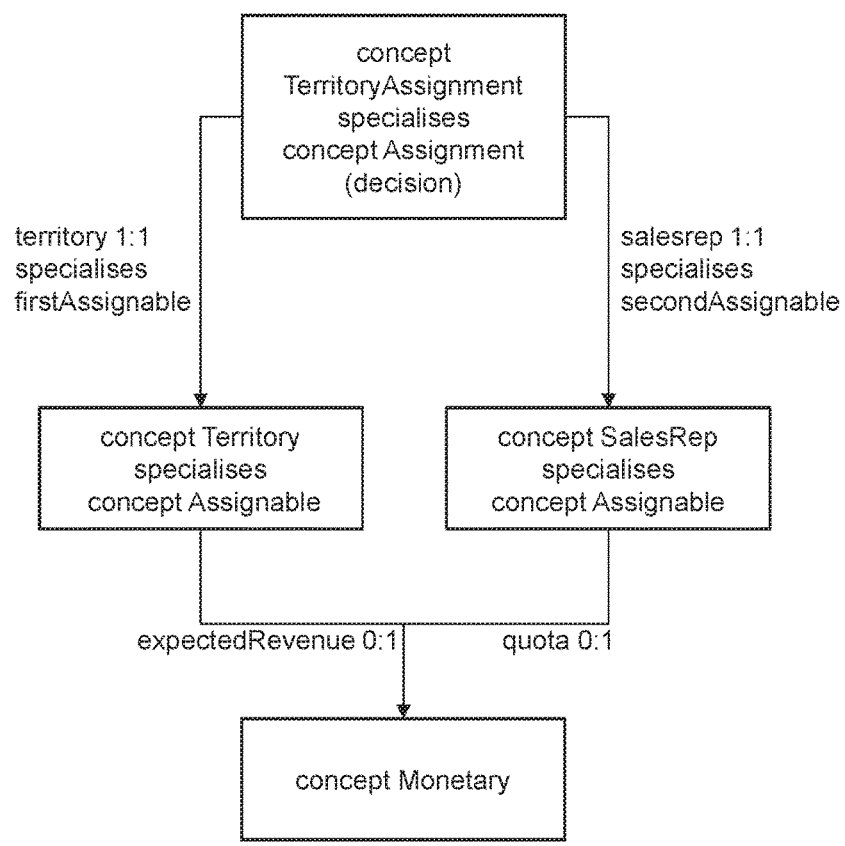

Concepts and concept properties can be tagged as decisions meaning that the instances of these concepts or the value of these properties can be proposed by the system 10. For example, the concept Assignment is tagged as a decision. A concept can specialize another concept allowing inheritance of properties, for example the concept TerritoryAssignment specializes Assignment, and the concept Territory and the concept SalesRep specialize Assignable. An inherited property can be specialized, for example properties territory and salesrep of concept TerritoryAssignment specialize respectively properties firstAssignable and secondAssignable of concept Assignment. FIG. 5 shows a further diagram of the interrelationship between concepts in a prescriptive domain.

A goal template and a constraint template are used to instantiate goals and constraints that should be taken into account when the system 10 suggests decisions. A template has a set of parameters (which can be empty) and a verbalization. An example of a goal template of the technical domain AssignmentProblem is:
goal BalanceAssignments
    parameter assignedInstances as set of Assignable
    parameter expression as NumericExpr
    verbalization(english): "Balance value of {exprOnCategory} over {assignedInstances}"

Note that here the term {exprOnCategory} means the verbalization of the exprOnCategory. This goal template takes as a first parameter a set of Assignable instances and as a second parameter a numeric expression (which is a built-in concept). The goal template is used to balance the value of a numeric expression computed on each element of the set of Assignable. An example of a constraint template of the base technical domain PrescriptiveProblem is as follows:
    constraint IterativeRelationalConstraint
    parameter objects as a set of Object
    parameter firstExpr as NumericExpr,
    parameter operator as RelationalOprerator,
    parameter secondExpr as NumericExpr
    verbalization(english): "the value of {firstExpr} should be {operator} the value of {secondExpr} on each instance of {objects}"

A goal or constraint template may require that specific properties have a value on selected concept instances. For instance, a goal template BalanceQuotaAndExpectedRevenue of business Domain TerritoryAssignmentProblem requires that quota has a value on SalesRep instances and expectedRevenue as a value on Territory instances, as shown below:
goal BalanceRatioQuotaExpectedRevenue
    requires SalesRep/quota
    requires TerritoryAssignment/expectedRevenue
    verbalization (english): "Balance the ratio between the total {Territory/expectedRevenue} of {Territory}(s) assigned to a {SalesRep} and its {SalesRep.quota}"

An example of a constraint template of business domain SalesTerritoryAssignment is as follows:
constraint MinRatioQuotaAndExpectedRevenue
    parameter minRatio as Ratio
    requires Territory/expectedRevenue
    requires Salesrep/quota
    verbalization(english): "the total {Territory.expectedRevenue} of {Territory}(s) assigned to a {SalesRep} should be greater than {minRatio}% of its {SalesRep.quota}."

Each business goal and constraint template also has an associated mapping rule which translate an instance of the goal or constraint into an instance of a goal or constraint templates of a unique target technical prescriptive domain. For example, a rule translating a business goal BalanceRatioQuotaExpectedRevenue into a technical goal BalanceAssignments is as follows:
map goal BalanceRatioQuotaExpectedRevenue to goal BalanceAssignments
    with assignedInstances bound to SalesRep
    with expression bound to divide(SalesRep/quota, sum(SalesRep/assignments/territory/expectedRevenue))

A mapping rule has to bind each parameter of the mapped goal to a value. The definition of the parameter value refers to concept and properties of the business domain where here the parameter assignedInstances is bound to the set of instances of SalesRep of the input dataset. The parameter expression is set to a numeric expression which includes two navigational paths: SalesRep/quota means the quota of the SalesRep instance considered and the sum(SalesRep/assignments/territory/expectedRevenue) means the sum of the expectedRevenue of the territory set in each instance of an assignment of the SalesRep instance considered.

The prescriptive analytics model 16 defines the actual concepts, constraint instances and goal instances that are used for computing decisions in a prescriptive analysis. A prescriptive analytics model 16 is always attached to a prescriptive domain, generally a business prescriptive domain 32. The model 16 includes the original dataset 14 as a semantic data model which describes the structures of the data found in the input dataset 14, for example the tables and columns as a set of concepts and how these concepts can be related to concepts and concept properties defined in the instances of the templates of the prescriptive domain within the model 16.

Figure 6:
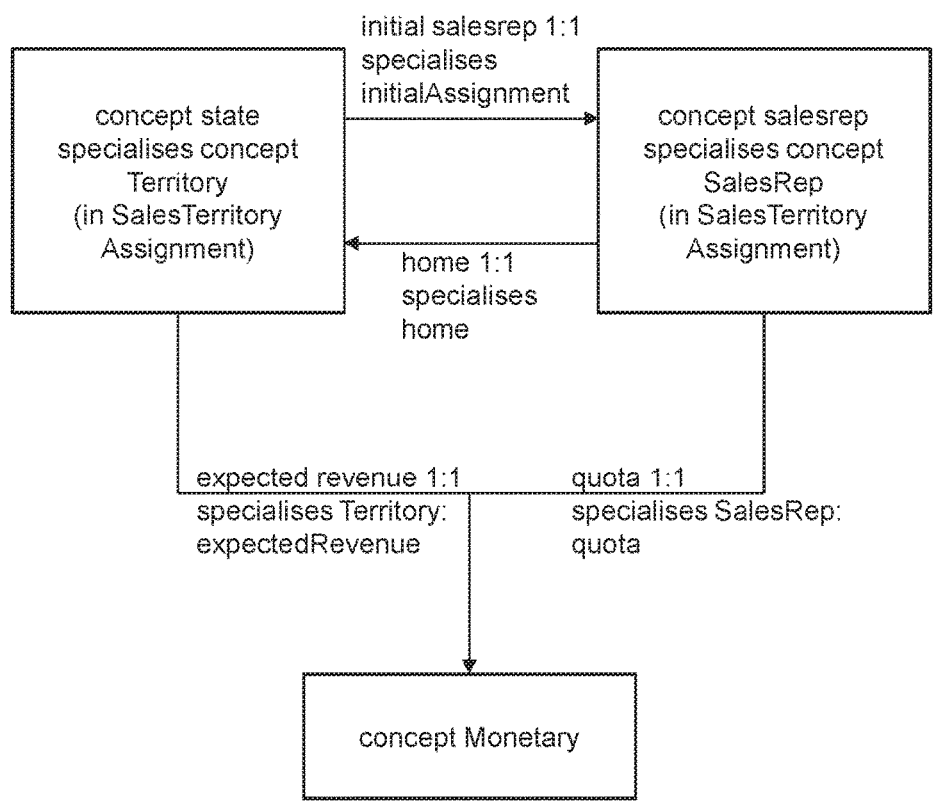
FIG. 6 is a schematic diagram of a semantic data model in accordance with an embodiment of the present invention.

In the assignment of sales reps to territories detailed above, the input dataset 14 has two tables states and salesreps. Assuming the prescriptive analysis to conduct is to decide assignment of sales to states, then the domain SalesTerritoryAssignment is associated to the analysis. A possible semantic data model for this input dataset 14 is shown in FIG. 6.

Figure 7:
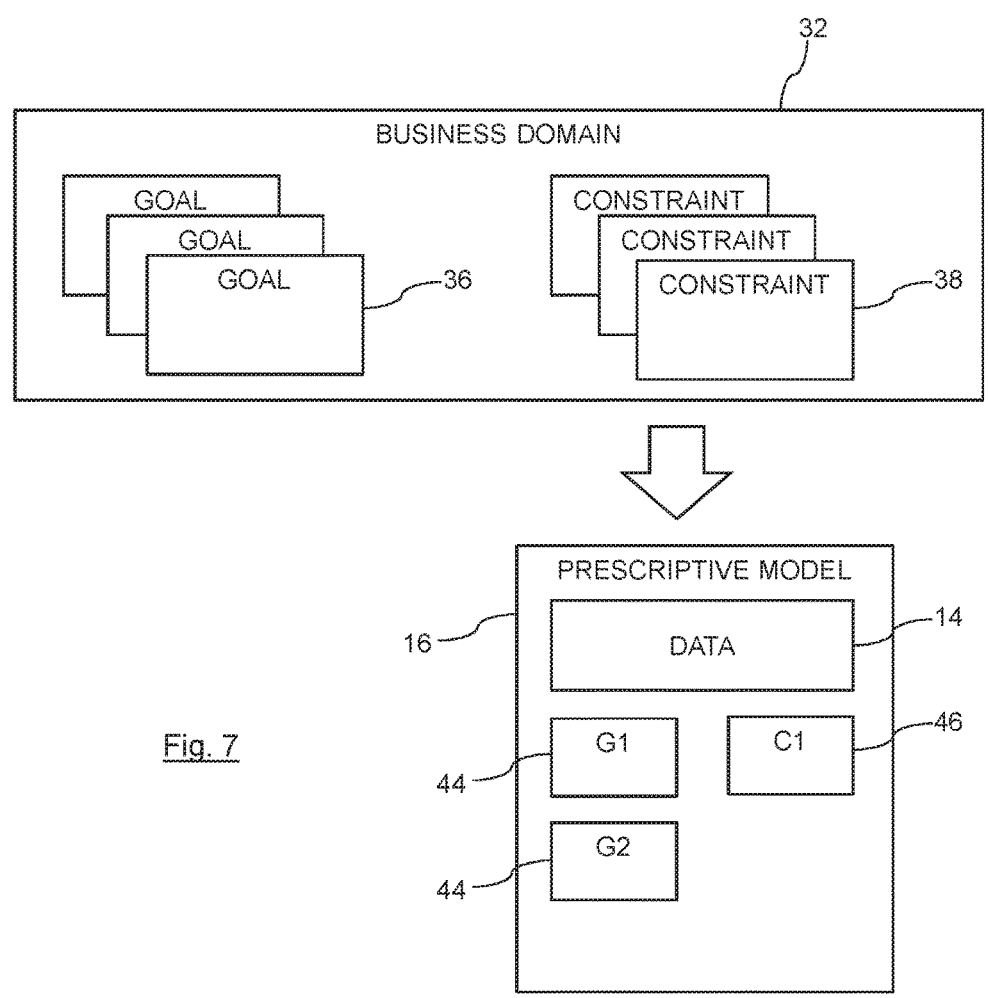
FIG. 7 is a schematic diagram of a business prescriptive domain and a business prescriptive model in accordance with an embodiment of the present invention.

The model 16 also includes multiple goal and constraint instances, which are instances of goal and constraint templates (at a business or technical domain level), defining a value for each of their parameters (if any). FIG. 7 shows an example of a business prescriptive model 16 which has been generated from the business prescriptive domain 32 and the user's dataset 14, with the user 12 interacting with the expert system 10 in order to determine the final prescriptive model 16. The business domain 32 comprises goal templates 36 and constraint templates 38 and the model 16 includes the dataset 14 and instances 44 of goal templates 36 and instances 46 of constraint templates 38.

The optimization model generation is a process that is split into two steps. The first step is to translate the business prescriptive model 16 into a technical prescriptive model and this is done by applying the mapping rules defined in the specification of business constraint and goal templates 36 and 38 and the second step is to translate the technical prescriptive model into an optimization model 18 and this is done by executing an optimization model generator associated to the target technical prescriptive model. At the end of this process the optimization model 18 can be sent to an optimization engine, such as an ILOG CPLEX optimizer and then the computed decision variables will be mapped to business decisions in the solution reported to the business user 12.

This system 20 provides a method to generate an optimization model 18 from the formal specification of a business prescriptive analytics problem, which is defined in the business prescriptive (analytics) model 16, applying to an input dataset 14. The system 20 allows the user 12 to define the business prescriptive analytics model 16 and the system 20 generates an optimization model 18 which is solved by a regular optimization engine, as IBM ILOG CPLEX Optimization Studio. The system 20 generates an optimization model 18 based on a hierarchy of prescriptive domains 30 and 32, where business prescriptive domains 32 are exposed to the end user 12 and used to specify a business prescriptive model 16. The business prescriptive domains 32 are specializations of technical prescriptive domains 30 which capture the hard math of building optimization models.

In order to compute optimized business decisions based on a business prescriptive analytics model 16 (a prescriptive analytics model defined 16 by the user 12), the system 20 uses a translation process to produce an optimization model 18 that is based on a clear separation between technical and business knowledge respectively captured in technical prescriptive domains 30 (such as the AssignmentProblem) and business prescriptive domains 32 (such as the SalesTerritoryAssignment and SalesOpportuniesAssignment). By using a clean separation between business and technical prescriptive domains 30 and 32, the system 20 allows a non-expert 12 to add a new business prescriptive domain 32 into the system 20 in a purely declarative way, without having to implement the complex translation of prescriptive models instantiated from this domain into optimization models.

The two step translation process brings a number of advantages. Firstly, the process exposes the user 12 to natural language definitions of business concepts, business constraints and business goals, and therefore getting rid of complex parameterization of the technical goals and constraints required to generate optimization models. Secondly, the process allows the definition in a technical prescriptive domain 30 of abstract concepts and abstract goal and constraint templates 36 and 38 that can be used to implement a generic optimization model generator that depends on the abstract class of problems to solve and not on the actual business problem. This increases the ability to use the technical prescriptive domain 30 as the target of multiple business prescriptive domains 32. Thirdly, the process allows a non-expert to add new business prescriptive domains 32 without having to implement complex generation of optimization models which requires in-depth operational research expertise. As a consequence, the translation process is especially well suited to be embedded in prescriptive analytics platforms/services which aim at providing simple experience to the end user 12 while allowing the rapid deployment of new business domains.

Figure 8:
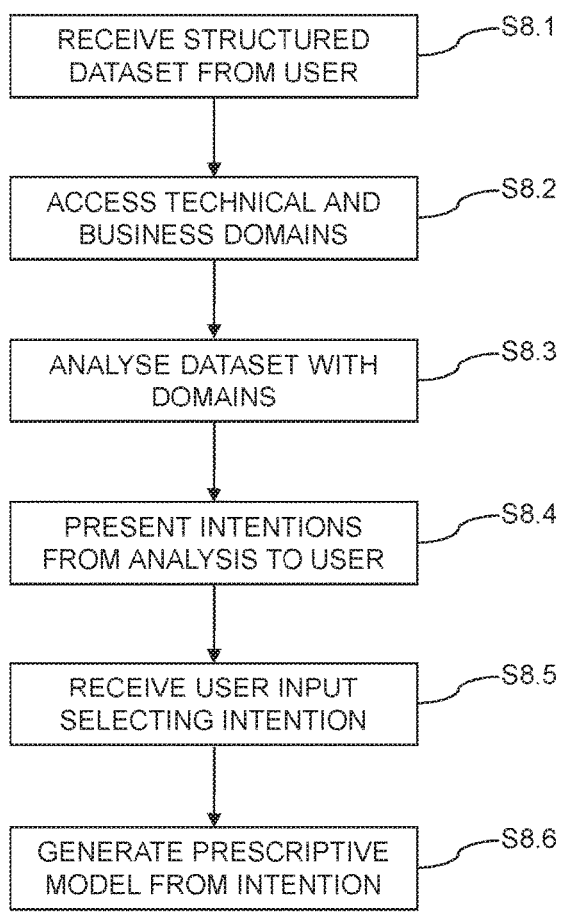
FIG. 8 is a flowchart of a method of operating the expert system in accordance with an embodiment of the present invention.

FIG. 8 is a flowchart of a method of operating the expert system 10 in order to generate the prescriptive model 16. The first step in the method is step S8.1, which comprises receiving a structured set of data 14. As discussed above, a user 12 can provide their dataset 14 to the expert system 10 in order to find the solution to a problem represented by that dataset 14. The user 12 may have a spreadsheet, for example that has data stored therein that is structured within the sheets and cells of the spreadsheet. The normal natural language of the business user 12 is used in the dataset 14, there is no requirement for the business user 12 to perform any pre-processing of their own data, the user 12 can provide the data 14 to the expert system 10 in its existing format.

The next step of the method is step S8.2, which comprises accessing a plurality of technical prescriptive domains 30 and business prescriptive domains 32 containing one or more templates, each template defining an intention, goal or constraint and each technical prescriptive domain 30 defining a generic optimization problem and each business prescriptive domain 32 extending a technical prescriptive domain 30 and defining a more specific business problem which is an implementation of the generic optimization problem defined in the technical prescriptive domain 30 from which the business prescriptive domain 32 extends. As discussed above, pre-authored technical prescriptive domains 30 and business prescriptive domains 32 are available to the expert system 10 which are accessed by the expert system 10, once the dataset 14 has been received from the user 12.

The next step of the method is step S8.3, which comprises analyzing the received structured set of data 14 with the plurality of technical prescriptive domains 30 and business prescriptive domains 32 to identify one or more technical and/or business prescriptive domains 32 that match the received structure set of data 14 in data structure and/or semantic terms. The processor 24 that is running the expert system 10 works through the technical prescriptive domains 30 and business prescriptive domains 32 in order to find at least one technical and/or business prescriptive domain 30 and 32 that matches the dataset 14 in data structure and/or semantic terms. For example, a user's business problem that relates to sales and assignment of resources in relation to sales and has an associated dataset 14 will have natural language terms within the dataset 14 such as "salesrep", "territory", "country", "customer" and so on, which can be matched to the content of at least one template within the prescriptive domains 30 and 32.

Once a match has been made, then the next step in the method is step S8.4, which comprise presenting a plurality of possible prescriptive intentions from the intention templates in the identified one or more technical and/or business prescriptive domains 32 that match the received structure set of data 14 in data structure and/or semantic terms. Assuming the simplest case that there is a single match made between the user's dataset 14 and a template within a technical or business prescriptive domain 30 and 32, then that domain 30 and 32 will contain various templates that define prescriptive intentions that each name and define an optimization problem that relates to the business problem under consideration. These are presented to the user 12 via the display device 22 so that the user 12 can select one of the prescriptive intentions.

The next step in the method is step S8.5, which comprises receiving a user input selecting one of the presented plurality of possible prescriptive intentions, and the final step in the method is step S8.6, which comprises generating a prescriptive model 16 from the technical or business prescriptive domain containing the selected prescriptive intention, the prescriptive model comprising the structured set of data and one or more instances of templates defining goals and/or constraints from the technical or business prescriptive domain containing the selected prescriptive intention. Of the variety of intentions provided to the user 12, one of these is selected by the user 12 and this is used to generate the prescriptive model 16 that defines problem that the user 21 is trying to solve and includes the necessary information relating to that problem.

Figure 9:
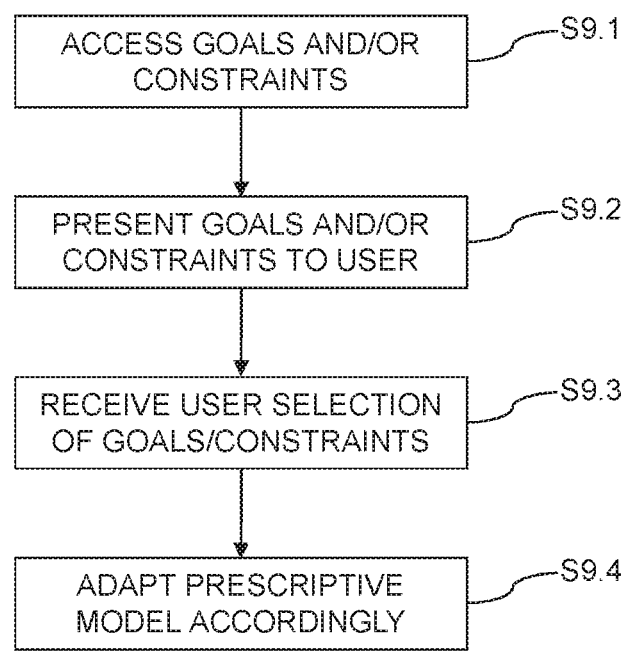
FIG. 9 is a flowchart of a method of adapting a prescriptive model in accordance with an embodiment of the present invention.

Further iteration of the prescriptive model 16, as illustrated in the flowchart of FIG. 9, is normally required to ensure that the goals and constraints embodied within the prescriptive model 16 fully reflect the intentions of the user 12. The user 12 can iterate the prescriptive model 16 in conjunction with the expert system 10, which will provide possible amendments that could change the prescriptive model 16 and will also interpret suggestions that the user 12 may wish to make. The first step of the iteration process is step S9.1, which comprises accessing goal and/or constraint templates from the technical or business prescriptive domain 30 or 32 containing the user's selected prescriptive intention. The goal and constraint templates are stored directly within the relevant technical or business prescriptive domain 30 or 32 and are accessed by the processor 24 and instances of the templates are presented to the user 12. A template instance is based upon a template in a domain, the user's data and optionally a user's natural language input.

A goal is a desired outcome of the ultimate optimization and a constraint is a limitation on the outcome of the optimization. For example, within the context of a prescriptive intention of "assign sales reps to territories" a goal that is offered to the user 12 could be "balance number of assigned states to sales reps as equally as possible" and a constraint offered to the user 12 could be "assign home state to each sales rep". These goals and constraints are present within the expert system 10 and are accessed by the processor 24, which can select a small number of such goals and constraints, such as five of each.

The next step of the method is step S9.2, which comprises presenting instances of the goal and/or constraint templates from the technical or business prescriptive domain 30 or 32 containing the selected prescriptive intention. At this stage, the processor 24 presents the selected instances of goal and constraint templates to the user 12 via the display device 22. The next step is step S9.3, which comprises receiving a further user input selecting one or more instances of a goal and/or constraint template from the presented instance of goals and/or constraint templates. Once presented to the user 12 on the display device 22, the user 12 can then select one or more of the instances of the goal and/or constraint templates as being relevant to the problem that they wish to solve.

The final step of the method is step S9.4, which comprises adapting the generated prescriptive model 16 according to the selected one or more instances of the goal and/or constraint templates. Once the user has made a selection of one or more instances of the goal and/or constraints templates then these can be used to adapt the prescriptive model 16 that has been generated from the initial selection of the prescriptive intention. For example, in the problem of assignment of sales reps to territories, there are numerous goals and constraints that the business user 12 may wish to use to modify the optimization problem. Since there will be an almost infinite way of distributing sales reps to territories, the selection of the goal and constraint templates will provide a more practical end solution. Each instance of a template that is selected from a prescriptive domain is represented in the prescriptive model 16 by the specific instance of that template. Specific parameters within a template may need to be set by the user 12 for example and these are stored within the instance of the template. A single unique template can have multiple instances within the model 16.

Figure 10:
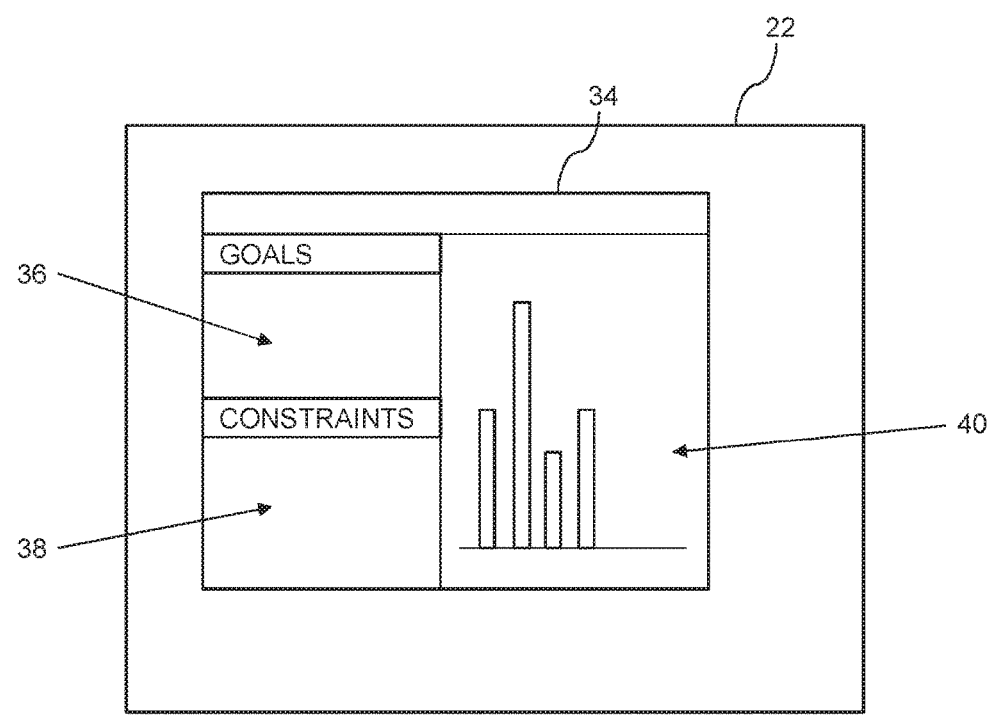
FIG. 10 is a schematic diagram of a display device of the computer system showing a user interface to the expert system in accordance with an embodiment of the present invention.

The user 12 is provided with a user interface 34 to the expert system 10, which is shown to the user 12 on the display device 22. An example of such a user interface 34 is shown in the FIG. 10. The expert system 10 is accessible to the business user 12 through the user interface 34, which here shows the goals 36, the constraints 38 and a graphical view 40 of the prescriptive model 16. The goals 36 and constraints 38 shown here are those selected by the processor 24 in the process of FIG. 5, where various goals 36 and/or constraints 38 can be selected by the user 12 in order to refine the model 16.

The graphical view 40 shows a current summary of the optimized solution as it stands with respect to the chosen intention (assign sales reps to territories) given the currently selected goals 36 and constraints 38. The business user 12 can choose to view the model 16 in different ways depending upon how the business user 12 wishes to interpret the problem that is trying to be solved. A default view in the current problem will show the states that are assigned to each sales rep as a bar chart, showing the number of states that each sales rep is currently assigned. A different view of the data could be a map showing the states and color coding the states according to which sales rep has been assigned to which state.

As the user 12 makes choices around the different goals 36 and constraints 38, then the representation of the data in the graphical view 40 will change. For example, in the initial view of the data, the user 12 may see that one sales rep has been assigned twelve different states and the user 12 may think that this is too many for one sales rep to handle. The user may therefore choose a constraint that is "maximum states per sales rep is 8" and this will cause the model 16 to be adapted accordingly and will therefore change the view 40 of the data represented in the model 16.

The instances of the goals 36 and constraints 38 are presented to the user 12 in language terms that the business user 12 will understand. The processor 24 is arranged to extract natural language components from the received structured set of data 14 and match at least some of the extracted natural language components to templates within the technical or business prescriptive domain 30 or 32 containing the user's selected prescriptive intention. The processor 24 is able to mine the dataset 14 for the terms that the user 12 is familiar with and match those terms to the specific equivalent in the relevant technical or business prescriptive domain 30 or 32. The prescriptive domain 30 or 32 will refer to "territory" as a general term, whereas the dataset 14 uses "state" (referring to a USA state). A different dataset 14 might use "country", "county" or "city" when referring to geographical areas.

When presenting the instances of the goals 36 and/or constraints 38 linked to the technical or business prescriptive domain 30 or 32 containing the user's selected prescriptive intention the processor 24 is arranged to present those instances of the goal templates 36 and/or constraint templates 38 using the extracted natural language components matched to the components within the business prescriptive domain 32 containing the selected prescriptive intention.

Any instances of goals 36 or constraints 38 presented to the user 12 through the user interface 34 are therefore constructed using the same language terms used in the user's dataset 14. This ensures that the user 12 is provided with options that are clear and make sense to the user 12 by using the same language that is present within the spreadsheet 14.

During their interaction with the expert system 10, the user 12 is able to select additional instances of goal templates 36 and constraint templates 38 from those suggested by the expert system 10 and presented to the user 12 in the user interface 34. Some of the possible instances of the goals 36 and constraints 38 can also include elements within them that the user can set or adjust, particularly if numerical values are present within the goal 36 or constraint 38. The constraint template 38 detailed above that the user 12 wishes to include "maximum states per sales rep is 8" can be presented in such a way that the user can select the numerical value from a dropdown menu, or manually enter the number themselves.

Additionally, the user 12 can attempt to create an instance of a goal 36 or constraint 38 from scratch by entering free text into a text box within the user interface 36. In this case, the processor 24 is arranged to receive a yet further user natural language input which defines a goal 36 and/or constraint 38, to determine one or more templates for goals 36 and/or constraints 38 that match the user's natural language input, to present instances of the determined one or more templates for goals 36 and/or constraints 38 that match the user's natural language input, to receive a user selection of a presented instance of a goal template 36 and/or constraint template 38 that match the user's natural language input and to adapt the generated prescriptive model 16 according to the user selection of an instance of a goal template 36 and/or constraint template 38.

In this way, if the user 12 wishes to add further restrictions to the problem being solved in the form of an instance of a goal 36 and/or a constraint 38 and they cannot find any instance of a goal 36 or constraint 38 that matches what they wish to define, then the user 12 can simply type in their normal language an approximation to an instance of a goal 36 and/or constraint 38 and the processor 24 will match the user's typing to one or more existing instances of a template for goals 36 or constraints 38 and present these to the user 12. The user 12 is than able to select and/or amend one of the presented instances of a goal template 36 and/or constraint template 38 and the prescription model 16 will be updated accordingly.

For example, the user 12 may wish to have a goal 36 that the sales reps travelling distance is kept to the minimum possible, but does not see any goal 36 that matches this desire of the user 12. The user 12 enters into the text box in the user interface 34 "keep reps distance low" and this will be recognized by the processor 24 and expressed as an instance of a goal 36 "minimize sales rep travelling distance". If the user 12 is happy that the suggested goal 36 matches the intention of the user 12 in this regard, then the user 12 can select the offered instance of the goal 36 and this is then used to adapt the prescriptive model 16, with an instance of the particular template being added to the model 16.

It is possible that instances of constraints 38 collide and either cannot be objectively resolved or cannot be resolved given the underlying data in the dataset 14. For example, if there are fifty-two states to cover and fourteen sales reps, then a constraint that states "no sales rep has more than two states" obviously cannot be resolved for this dataset 14. If the user 12 attempts to add an instance of a template for a constraint 38 that would lead to a conflict, then this is detected by the processor 12 and the expert system 10 will inform the user that they cannot add the offending instance of a constraint 38 to the current model 16. In this case, the processor 24 is operated to further detect that a user selected instance of a constraint template 38 from the presented instances of constraints 38 leads to a conflict with one or more existing instances of constraint templates 38 for the prescriptive model 16 and therefore presents a warning regarding the conflict between the user selected instance of a constraint 38 from the presented instances of constraints 38 and the one or more existing instances of constraints for the prescriptive model 16.

The business user 12 is provided with a system 20 where, starting from their own dataset 14, the user 12 can build a representation of their business problem which can later be transformed into an optimization model that can be solved using operations research techniques. This representation is the prescriptive model 16. The prescriptive model 16 is not an optimization model but an instantiation of templates taken from the prescriptive domains 30 and 32 and which can later be transformed automatically into an optimization model. In the example discussed above concerning the assignment of sales reps to territories, the constructed prescriptive model 16 would be made of a structured data set (sales reps are sales representatives, states are territories etc.), and instances of templates defining an intention (such as assign sales reps to states), a set of goals (such as minimize average distance between sales reps' home and assigned states and/or balance the ratio of expected revenue with respect to quota overall sales reps), and a set of constraints (such as maximum or minimum number of sales reps per state). The intent, goals and constraints are instances of templates available in the prescriptive domains 30 and 32 but these instances are using user data taken from the user's dataset 14.

A complex process is provided that allows the business user 12 to define the prescriptive model 16 corresponding to their business problem and their dataset 14, which can subsequently be transformed automatically into an optimization model, solving the optimization model and transforming back the optimal solution into decisions the business user 12 can understand. The business user 12 can later interact with the solution by adding/removing extra goals 36 and constraints 38 and getting new solutions. The computer system 20 also interprets the solution and suggests new goals 36 and constraints 38 based on the solution and on optional natural language input text from the business user 12.

To create the prescriptive model 16, a set of prescriptive domains 30 and 32 are predefined. Technical prescriptive domains 30, for given categories of optimization problems, are provided within the computer system 20. In a technical prescriptive domain 30, an operations research expert describes how some technical problem can be automatically transformed into an optimization model. Business prescriptive domains 32, for given categories of business problems are also provided within the computer system 20. In a business prescriptive domain 32, a business expert can describe the correspondence between this business problem and the underlying technical prescriptive domain 30. Business prescriptive domains 32 always rely on one existing technical prescriptive domain 30 and a new business prescriptive domain 32 can be created without the support of an operations research expert.

The business user 12 starts from their dataset 14, which is analyzed and the user 12 interacts with the system 20 to configure and elicit an intention belonging to one domain 32, and a set of goals 36 and constraints 38 which are expressed in a vocabulary and use a syntax the user 12 can understand and which preferably reuses the vocabulary of the user's dataset 14. The resulting formulation of the business problem is called the prescriptive model 16. This step is performed using the predefined prescriptive domains 30 and 32.

The prescriptive model 16 can then be automatically transformed into an optimization model. This is performed using mechanisms described in the technical prescriptive domains 30 used by the business prescriptive domain 32 corresponding to the business problem. Then the optimization model can be solved and the solution can be represented to the business user 12 in a form they can understand thanks to automatic inverse mapping of the optimization results to the user's original data. Along with the solution, the business user 12 is offered some additional goals 36 and constraints 38 of interest. Some of these can be based on additional input from the business user 12 and the current proposed solution. The business user 12 can provide feedback using comments/annotations of the current solution and the system 20 will be able to add in the optimization model the constraints 38 required to represent these annotations.

The business user 12 starts the whole process from their dataset 14, with their own data model. The business user 12 can formulate the prescriptive model 16 using this vocabulary, concepts from their dataset 14, configuring goals 36 and constraints 38 which are suggested and eliciting other goals 36 and constraints 38 using natural language. An optimization model can be automatically generated and solved thanks to the underlying technical prescriptive domain 30 of the used business prescriptive domain 32. There is no need for an optimization expert to add new business prescriptive domains 32. There are many business problems corresponding to the technical domain 30 of resource assignment, where some things have to be assigned to some other things, and it is possible to create domains 32 for these other problems without experts being involved and these domains 32 will then allow business users 12 to easily formulate their business problem as a prescriptive model 16.

Figure 11:
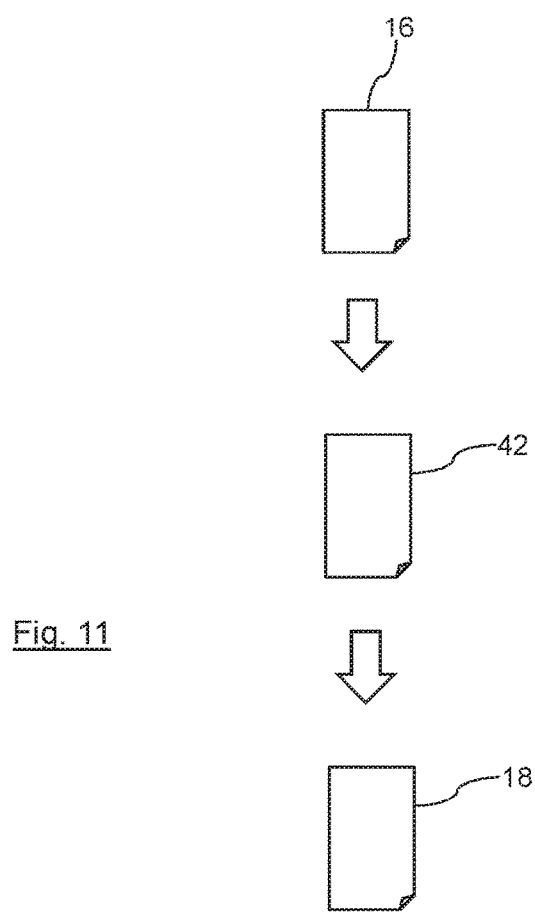
FIG. 11 is a flow diagram of a process of transforming a prescriptive model into an optimization model in accordance with an embodiment of the present invention.

FIG. 11 shows a flow process that is carried out by the system 20, once the prescriptive model 16 has been created by the user 12 from their dataset 14, in conjunction with the user 12 making decisions about goals and constraints with respect to the problem that the user 12 wishes to solve. The decisions taken by the user 12, while interacting with the system 20, result in the final prescriptive model 16. The prescriptive model 16 is then transformed into an optimization model 18 via an intermediate stage of a technical prescriptive model 42. The optimization model 18 can then be solved by a optimization solver that will provide at least one solution to the optimization problem that is defined in the user's original business prescriptive model 16.

Figure 12:
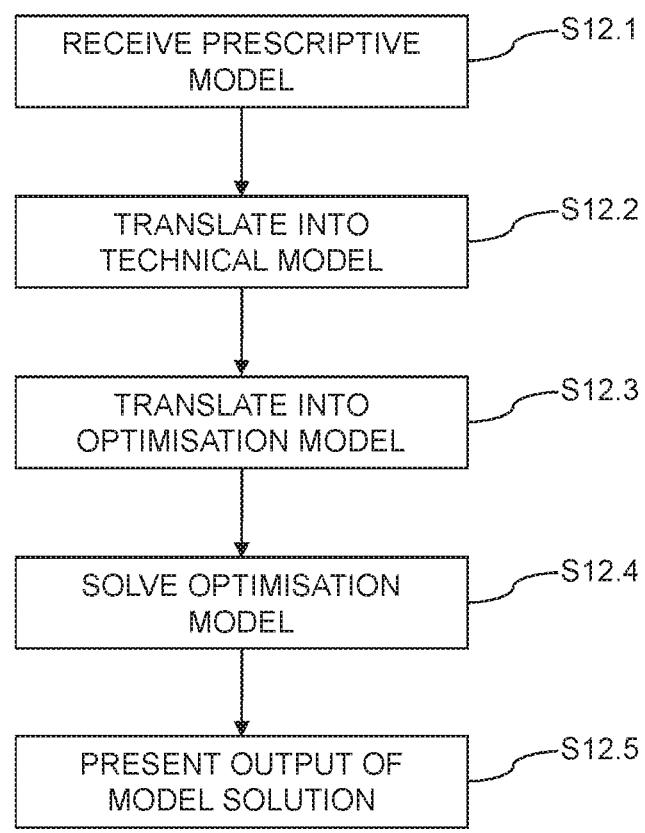
FIG. 12 is a flowchart of a method of transforming a prescriptive model into an optimization model in accordance with an embodiment of the present invention.

FIG. 12 summarizes the method of generating the optimization model 18. The method comprises firstly step S12.1, which comprises receiving the prescriptive model 16, which comprises the structured set of data 14 and one or more instances 44 and 46 of templates 36 and 38 of a technical and/or business prescriptive domain 30 and 32, where the instances 44 and 46 of the templates 36 and 38 define goals and/or constraints for the structured set of data 14. As discussed above, the business prescriptive domain 32 extends a technical prescriptive domain 30 that defines a generic optimization problem and the business prescriptive domain 30 defines a more specific business problem which is an implementation of the generic optimization problem defined in the technical prescriptive domain 32 from which the business prescriptive domain 30 extends.

The next step in the method is step S12.2, which comprises translating the prescriptive model 16 into a technical prescriptive model 42 using a set of mapping rules to translate the instance(s) of the templates of the business prescriptive domain 32 into instance(s) of the templates of the technical prescriptive domain 30 from which the business prescriptive domain 32 extends. The various instances of the goals and/or constraints that are included within the business prescriptive model 16 are converted into instances of templates of the technical prescriptive domain 30 using a set of mapping rules. In a preferable arrangement, each respective mapping rule forms part of the instance of a template of the business prescriptive domain 32 and a respective mapping rule defines how the instance of a template of the business prescriptive domain 32 is translated into an instance of a template of the related technical prescriptive domain 30.

The next step in the method is step S12.3, which comprises translating the technical prescriptive model 42 into an optimization model 18. The next step in the method is step S12.4, which comprises solving the optimization model 18, and the final step of the method is step S12.5, which comprises presenting an output defining a solution from the solved optimization model 18. Once an optimization model 18 has been built from the original business prescriptive model 16, then an optimization tool, run by the processor 24 of the system 20 will solve the optimization model 18 and present at least one solution to the model 18. A solution is an output that satisfies all of the goals and constraints within the models 16 and 18 for the given dataset 14. There may only be a single solution to the optimization problem defined by the models 16 and 18, but more likely there will be multiple acceptable solutions.

In the example above of the territory assignment problem, which is one where the business user 12 must assign their sales reps to individual states, then the user 12 has selected various goals and/or constraints from the relevant business prescriptive domain 32 and these are used to create the business prescriptive model 16. These goals and constraints place limitations on the solution and the final output of solved optimization model 18 is a solution that satisfies the user's goals and constraints.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer implemented method for generating a solution to an optimization problem, the method comprising:
  receiving a structured set of data;
  accessing, by a processor, a plurality of prescriptive domains containing one or more templates, each template defining an intention, goal or constraint, wherein the each template comprises a set of parameters and a verbalization, wherein the plurality of prescriptive domains comprises a technical prescriptive domain and a business prescriptive domain, wherein the technical prescriptive domain defines a generic optimization problem, wherein the business prescriptive domain extends the technical prescriptive domain and defines a more specific business problem which is an implementation of the generic optimization problem defined in the technical prescriptive domain from which the business prescriptive domain extends;

analyzing, by the processor, the received structured set of data with the prescriptive domains to identify one or more prescriptive domains that match the received structure set of data in data structure and/or semantic terms;

presenting a plurality of possible prescriptive intentions from the intention templates in the identified one or more prescriptive domains that match the received structure set of data in data structure and/or semantic terms;

receiving a user input selecting one of the presented plurality of possible prescriptive intentions;

generating, by the processor, a prescriptive model from the prescriptive domain containing the selected prescriptive intention, the prescriptive model comprising the structured set of data and one or more instances of templates defining goals and/or constraints from the prescriptive domain containing the selected prescriptive intention;

translating, by the processor, the prescriptive model into a technical prescriptive model using a set of mapping rules to translate instances of the templates of the prescriptive domain into instances of templates of the technical prescriptive domain;

translating, by the processor, the technical prescriptive model into an optimization model;

solving, by the processor, the optimization model; and presenting an output defining a solution from the solved optimization model;

wherein each instance of a template of the prescriptive domain comprises a mapping rule, the mapping rule defining the translation of a respective instance of the template of the prescriptive model into an instance of a template of the technical prescriptive model and wherein the translating of the prescriptive model into the technical prescriptive model using the set of mapping rules to translate the instances of the templates of the prescriptive domain into the instances of the templates of the technical prescriptive domain comprises:

accessing each translation rule in a respective instance of the template of the prescriptive domain and executing each accessed translation rule on the respective instance of the template of the prescriptive domain.

2. The method as recited in claim 1 further comprising:

accessing goal and/or constraint templates from the prescriptive domain containing the selected prescriptive intention;

presenting instances of the goal and/or constraint templates from the prescriptive domain containing the selected prescriptive intention;

receiving a further user input selecting one or more instances of the goal and/or constraint template(s) from the presented instances of the goal and/or constraint templates; and adapting the generated prescriptive model according to the selected one or more instances of the goal and/or constraint template(s).

3. The method as recited in claim 2 further comprising:

extracting natural language components from the received structured set of data and matching at least some of the extracted natural language components to templates within the prescriptive domain containing the selected prescriptive intention, and wherein the presenting of the instances of the goal and/or constraint templates from the prescriptive domain containing the selected prescriptive intention comprises presenting those instances of the goal and/or constraint templates using the extracted natural language components.

4. The method as recited in claim 1 further comprising:

extracting natural language components from the structured set of data; mapping the extracted natural language components to components within the instance(s) of a template of the prescriptive model; and maintaining the mapped natural language components through the translation of the prescriptive model into the technical prescriptive model and through the translation of the technical prescriptive model into the optimization model and wherein the presented output defining a solution from the solved optimization model includes the extracted natural language components.

5. A computer program product for generating a solution to an optimization problem, the computer program product comprising a computer readable storage medium having program code embodied therewith, the program code comprising the programming instructions for:

receiving a structured set of data;

accessing a plurality of prescriptive domains containing one or more templates, each template defining an intention, goal or constraint, wherein the each template comprises a set of parameters and a verbalization, wherein the plurality of prescriptive domains comprises a technical prescriptive domain and a business prescriptive domain, wherein the technical prescriptive domain defines a generic optimization problem, wherein the business prescriptive domain extends the technical prescriptive domain and defines a more specific business problem which is an implementation of the generic optimization problem defined in the technical prescriptive domain from which the business prescriptive domain extends;

analyzing the received structured set of data with the prescriptive domains to identify one or more prescriptive domains that match the received structure set of data in data structure and/or semantic terms;

presenting a plurality of possible prescriptive intentions from the intention templates in the identified one or more prescriptive domains that match the received structure set of data in data structure and/or semantic terms;

receiving a user input selecting one of the presented plurality of possible prescriptive intentions;

generating a prescriptive model from the prescriptive domain containing the selected prescriptive intention, the prescriptive model comprising the structured set of data and one or more instances of templates defining goals and/or constraints from the prescriptive domain containing the selected prescriptive intention;

translating the prescriptive model into a technical prescriptive model using a set of mapping rules to translate instances of the templates of the prescriptive domain into instances of templates of the technical prescriptive domain;

translating the technical prescriptive model into an optimization model;

solving the optimization model; and presenting an output defining a solution from the solved optimization model;

wherein each instance of a template of the prescriptive domain comprises a mapping rule, the mapping rule defining the translation of a respective instance of the template of the prescriptive model into an instance of a template of the technical prescriptive model and wherein the translating of the prescriptive model into the technical prescriptive model using the set of mapping rules to translate the instances of the templates of the prescriptive domain into the instances of the templates of the technical prescriptive domain comprises the programming instructions for:
accessing each translation rule in a respective instance of the template of the prescriptive domain and executing each accessed translation rule on the respective instance of the template of the prescriptive domain.

6. The computer program product as recited in claim 5, wherein the program code further comprises the programming instructions for:
accessing goal and/or constraint templates from the prescriptive domain containing the selected prescriptive intention;
presenting instances of the goal and/or constraint templates from the prescriptive domain containing the selected prescriptive intention;
receiving a further user input selecting one or more instances of the goal and/or constraint template(s) from the presented instances of the goal and/or constraint templates; and
adapting the generated prescriptive model according to the selected one or more instances of the goal and/or constraint template(s).

7. The computer program product as recited in claim 6, wherein the program code further comprises the programming instructions for:
extracting natural language components from the received structured set of data and matching at least some of the extracted natural language components to templates within the prescriptive domain containing the selected prescriptive intention, and wherein the presenting of the instances of the goal and/or constraint templates from the prescriptive domain containing the selected prescriptive intention comprises presenting those instances of the goal and/or constraint templates using the extracted natural language components.

8. The computer program product as recited in claim 5, wherein the program code further comprises the programming instructions for:
extracting natural language components from the structured set of data; mapping the extracted natural language components to components within the instance(s) of a template of the prescriptive model; and
maintaining the mapped natural language components through the translation of the prescriptive model into the technical prescriptive model and through the translation of the technical prescriptive model into the optimization model and wherein the presented output defining a solution from the solved optimization model includes the extracted natural language components.

9. A system, comprising:
a memory unit for storing a computer program for generating a solution to an optimization problem; and
a processor coupled to the memory unit, wherein the processor is configured to execute the program instructions of the computer program comprising:
receiving a structured set of data;
accessing a plurality of prescriptive domains containing one or more templates, each template defining an intention, goal or constraint, wherein the each template comprises a set of parameters and a verbalization, wherein the plurality of prescriptive domains comprises a technical prescriptive domain and a business prescriptive domain, wherein the technical prescriptive domain defines a generic optimization problem, wherein the business prescriptive domain extends the technical prescriptive domain and defines a more specific business problem which is an implementation of the generic optimization problem defined in the technical prescriptive domain from which the business prescriptive domain extends;
analyzing the received structured set of data with the prescriptive domains to identify one or more prescriptive domains that match the received structure set of data in data structure and/or semantic terms;
presenting a plurality of possible prescriptive intentions from the intention templates in the identified one or more prescriptive domains that match the received structure set of data in data structure and/or semantic terms;
receiving a user input selecting one of the presented plurality of possible prescriptive intentions;
generating a prescriptive model from the prescriptive domain containing the selected prescriptive intention, the prescriptive model comprising the structured set of data and one or more instances of templates defining goals and/or constraints from the prescriptive domain containing the selected prescriptive intention;
translating the prescriptive model into a technical prescriptive model using a set of mapping rules to translate instances of the templates of the prescriptive domain into instances of templates of the technical prescriptive domain;
translating the technical prescriptive model into an optimization model;
solving the optimization model; and
presenting an output defining a solution from the solved optimization model;
wherein each instance of a template of the prescriptive domain comprises a mapping rule, the mapping rule defining the translation of a respective instance of the template of the prescriptive model into an instance of a template of the technical prescriptive model and wherein the translating of the prescriptive model into the technical prescriptive model using the set of mapping rules to translate the instances of the templates of the prescriptive domain into the instances of the templates of the technical prescriptive domain comprises:
accessing each translation rule in a respective instance of the template of the prescriptive domain and executing each accessed translation rule on the respective instance of the template of the prescriptive domain.

10. The system as recited in claim 9, wherein the program instructions of the computer program further comprise:
accessing goal and/or constraint templates from the prescriptive domain containing the selected prescriptive intention;
presenting instances of the goal and/or constraint templates from the prescriptive domain containing the selected prescriptive intention;
receiving a further user input selecting one or more instances of the goal and/or constraint template(s) from the presented instances of the goal and/or constraint templates; and
adapting the generated prescriptive model according to the selected one or more instances of the goal and/or constraint template(s).

11. The system as recited in claim 10, wherein the program instructions of the computer program further comprise:
   extracting natural language components from the received structured set of data and matching at least some of the extracted natural language components to templates within the prescriptive domain containing the selected prescriptive intention, and wherein the presenting of the instances of the goal and/or constraint templates from the prescriptive domain containing the selected prescriptive intention comprises presenting those instances of the goal and/or constraint templates using the extracted natural language components.

12. The system as recited in claim 8, wherein the program instructions of the computer program further comprise:
   extracting natural language components from the structured set of data; mapping the extracted natural language components to components within the instance(s) of a template of the prescriptive model; and
   maintaining the mapped natural language components through the translation of the prescriptive model into the technical prescriptive model and through the translation of the technical prescriptive model into the optimization model and wherein the presented output defining a solution from the solved optimization model includes the extracted natural language components.

* * * * *